(12) United States Patent
Ettaleb et al.

(10) Patent No.: US 7,010,376 B2
(45) Date of Patent: Mar. 7, 2006

(54) DIAGNOSTIC FOR POORLY TUNED CONTROL LOOPS

(75) Inventors: Lahoucine Ettaleb, Pointe-Claire (CA); Alain André Roche, Montréal (CA)

(73) Assignee: Pulp and Paper Research Institute of Canada, Pointe-Claire (CA)

( * ) Notice: Subject to any disclaimer, the term of this patent is extended or adjusted under 35 U.S.C. 154(b) by 119 days.

(21) Appl. No.: 10/691,512

(22) Filed: Oct. 24, 2003

(65) Prior Publication Data

US 2004/0088058 A1 May 6, 2004

Related U.S. Application Data

(60) Provisional application No. 60/421,090, filed on Oct. 25, 2002.

(51) Int. Cl.
*G06F 19/00* (2006.01)
(52) U.S. Cl. .................... 700/111; 700/80; 700/81; 700/110; 700/174
(58) Field of Classification Search ................ 700/80, 700/111, 81, 110, 174
See application file for complete search history.

(56) References Cited

U.S. PATENT DOCUMENTS

| | | |
|---|---|---|
| 4,885,676 A | 12/1989 | Zweighaft |
| 5,249,119 A | 9/1993 | Kaseda et al. |
| 5,784,273 A * | 7/1998 | Madhavan ............... 700/71 |
| 5,796,606 A | 8/1998 | Spring |
| 5,838,561 A | 11/1998 | Owen |
| 6,208,497 B1 * | 3/2001 | Seale et al. ............ 361/160 |
| 6,298,454 B1 * | 10/2001 | Schleiss et al. .......... 714/37 |
| 2002/0077711 A1 * | 6/2002 | Nixon et al. ............ 700/51 |
| 2003/0040818 A1 * | 2/2003 | Pletner et al. .......... 700/60 |

FOREIGN PATENT DOCUMENTS

WO    WO/98/12611    3/1998

OTHER PUBLICATIONS

Thomas J. Harris, "Assessment of control loop performance", *The Canadian Journal of Chemical Engineering*, vol. 67, pp 856-861, Oct. 1989.
Alexander Horch et al.,"Diagnosis and characterization of oscillations in process control loops", pp 161-165, 2000.

* cited by examiner

*Primary Examiner*—Leo Picard
*Assistant Examiner*—Michael D. Masinick
(74) *Attorney, Agent, or Firm*—Ogilvy Renault LLP

(57) ABSTRACT

A method and apparatus to perform an automatic diagnosis for the poor performance of a control loop, and to determine whether or not the malfunctioning is caused principally by a poor adjustment of the controller tuning parameters. The method makes use of the fact that a poorly tuned control loop amplifies disturbances in a narrow frequency range around the so-called resonant frequency. The method comprises measuring an error in a control loop over time to determine a power spectral density of the error, determining a best fit analytical function describing the power spectral density and measuring a diagnostic value from a difference between the best fit analytical function and the power spectral density of the error.

13 Claims, 11 Drawing Sheets

Power spectrum densities, $\Gamma_M(f)$ and $\Gamma(f)$, for the pressure control loop Figure 1: Typical industrial control loop Figure 2: Approximated spectrum, $\Gamma_M(f)$, of the deviation error signal.

Spectrum of the deviation error signal ER (t), showing the presence of harmonics.

Figure 4: Output response for a level control loop.

Figure 5: Power spectrum densities, $\Gamma_M(f)$ and $\Gamma(f)$, for the level control loop Figure 6: Output response for a pressure control loop.

Figure 7: Power spectrum densities, $\Gamma_M(f)$ and $\Gamma(f)$, for the pressure control loop Figure 8: Output response of a temperature control loop.

Power spectrum densities, $\Gamma_M(f)$ and $\Gamma(f)$, for the temperature control loop

DIAGNOSTIC FOR POORLY TUNED CONTROL LOOPS

This application claims the benefit of Provisional Application Ser. No. 60/421,090, filed Oct. 25, 2002.

BACKGROUND OF THE INVENTION

1. Field of the Invention

The present invention relates to process control systems and, more particularly, to automatic detection of oscillation caused by poorly tuned control.

2. Description of the Prior Art

Large complex manufacturing systems, such as pulp and paper mills or chemical petroleum plant, contain often thousands of control loops. The performance of some of these loops is critical to the quality and the uniformity of the final product. In such a large system, variability is introduced in a variety of ways; non-linearity of valves or sensors, controller tuning, process upsets, disturbances, loop interactions, operator interactions and these are only a few of them. Determining what particular problem is affecting the control performance is a non-trivial matter. This can be addressed in two steps: the first step is to detect poorly performing loops and then, in the second step, determine the reason of such poor performance for each loop identified. Or, equivalently, quantification of control loop performance using performance indices, followed by diagnosis to determine what causes the poor performance.

In the article "Assessment of control loop performance", by T. J. Harris, Can. J. Chem. Eng., 67, pp. 856–861, 1989, Harris proposed comparing the observed level of variance of a controlled variable to the minimum variance controller. In essence, the proposed method detects whether or not there exists an excessive variability; therefore one can categorize loops, into poorly performing loops and acceptable performing loops. The result of the assessment depends on the accuracy of the process time delay, data sampling rate and on how the minimum variance benchmark is estimated. This method does not diagnose directly the cause of the poor performance. Increase in the level of variability is used to detect malfunctioning control loop in U.S. Pat. No. 4,885,676, U.S. Pat. No. 5,249,119 and, more recently in U.S. Pat. No. 6,298,454. The drawback of this approach is that the results are affected by internal process upsets and the lack of diagnostic engine to determine specifically what causes poor performance. The interaction of operators may have a great impact on control loop performance. To resolve this issue, R. Spring in U.S. Pat. No. 5,796,606 proposed to monitor continuously all loops, how often they are in manual mode, and which loops are frequently in alarm. He also proposed to determine recursively certain statistical parameters. The monitoring system resides inside the distributed control system (DCS). This adds more load to the DCS system, and the recursive calculations may be biased due to any loop upset.

In a large industrial plant, poor performance is often due to the large number of loops involved and the lack of personnel available to perform the tuning. Many controllers run with default settings that do not optimize loop performance. In other cases, the tuning is done based on the common sense of operators, which can be a misleading practice. Degradations in control performance due, principally, to tuning problems are not extensively addressed in the literature. Most studies are dedicated to proportional, derivative and integral control loops and how to self tune those parameters as done in WO98/12611. On the other hand, detection of poor performance due to a non-linear phenomenon such as actuator or sensor malfunctioning is the subject of many articles in the literature. In the article "Diagnosis and characterization of oscillations in process control loops", by A. Horch, A. J. Isaksson and K. Forsman, Control Systems, 161–165, 2000, it is proposed to use the cross-correlation between the control output and the process variable. Their approach states that, in the presence of stiction, the cross-correlation is null at the zero lag. This method addresses only the case of non-linearity caused by stiction. In practice, valves may be subject to stiction or backlash and, more often, to a combination of the two. The problem of actuator failure is addressed in U.S. Pat. No. 5,838,561. In this Patent, the diagnostic of actuator malfunctioning is based on the use of a probability distribution of the deviation error. The reliability of the diagnostic depends on having a large data set, and can be affected by loop upsets. However, this Patent addresses in a very efficient way the problem of poor performance due to loop interactions.

SUMMARY OF THE INVENTION

It is an object of the present invention to diagnose control loops to determine whether control loop error is due to tuning or control loop component failure. Furthermore, it is an object of the invention to quantify such determination so as to be able to determine whether a corrective response is necessary.

A method has been developed to perform an automatic diagnosis for the poor performance, and to determine whether or not the malfunctioning is caused principally by a poor adjustment of the controller tuning parameters. The method makes use of the fact that a poorly tuned control loop amplifies disturbances in a narrow frequency range around the so-called resonant frequency. The diagnostic method is based on a comparison between the calculated power spectral density of the control error and an analytical representation for a poorly tuned loop with a similar resonant frequency.

A diagnostic method determines automatically whether or not excess variability in a feedback control loop is due, mainly, to poor selection of controller tuning parameters. The power spectral density of the control error, or of the controlled variable, is calculated. Its characteristics are used to derive an analytical representation of a poorly tuned control loop whose resonant frequency and amplification at that frequency matches those calculated for the actual control loop. The diagnostic is based on the ability of the analytical representation to predict the actual power spectral density of the control error, or of the controlled variable, over the entire frequency range excluding frequencies close to zero where the power spectrum density is likely to be poorly estimated.

The invention also provides a diagnostic apparatus for analyzing control loops, comprising means for recording an error signal between a set-point value and a detected process value, means for determining the power spectrum of the error signal, means for determining a best fit analytical function describing the power spectrum associated with the error signal and means for calculating the difference between the best fit analytical function and the power spectrum, in order to output a diagnostic value.

The invention provides a software product for performing the method of diagnosis of control loops according to the method of the present invention.

DETAILED DESCRIPTION OF THE INVENTION

There are many reasons for degradations in control loop performance. Some of them are attributed to inaccurate sensor readings due to bias, or to actuators that are not responding properly to control signals, due to non-linear phenomena such as backlash or stiction. Such equipment failure may results in a limit cycle, due to the controller's inability to position the valve to maintain a set-point, Weldon A. D. et al. "Control valves—The key component in managing process variability. *Tappi Journal*, 80 (8) 71–74 (1997)".

Degradations in control performance might also be due to poor control tuning, or to interactions with defective loops. Poor tuning can also result in a loop oscillating. Oscillations have an impact on product uniformity, and can cause increased energy consumption and waste of raw material. A recent paper by Clarke et al. "Sensor, actuator, and loop validation. *IEEE Control Systems Magazine*, 39–45, August (1995)" showed that, by eliminating oscillations in control loops, a 6% saving in the steam consumption of a batch temperature controlled process was possible.

As mentioned before, there are many reasons for a control loop to oscillate. The main ones are: oscillations due to an actuator or sensor non-linearity, a loop oscillating because of its interaction with another oscillating loop, or oscillation caused by a mal-tuned controller. It is of interest to localise the source of oscillations, and then take the appropriate action. Knowledge of the presence of oscillations in control loops may be obtained using, for example, discrete fast Fourier transforms.

Figure 1:
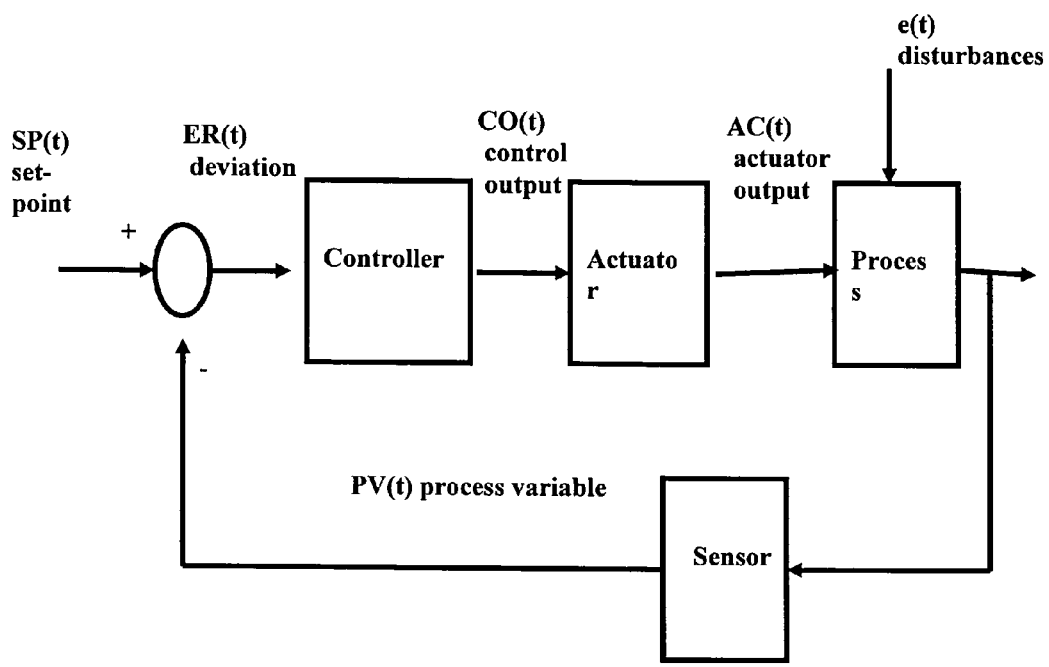
FIG. 1 is a block diagram of a process control loop that is representative of many industrial control loops. The control action generates an output control signal, CO(t), based on a deviation error signal, ER(t), between the setpoint, SP(t), and a measured process variable, PV(t). The control signal is then applied to an actuator which translates that electrical signal to a physical action (e.g., opening a valve). A sensor is used to measure the process variable, PV(t).

To study the source of oscillation, we consider the control loop of FIG. 1. In what follows, we assume that the cause of the oscillations is internal to the control loop, such that oscillations are either due to a control tuning problem or to an actuator/sensor problem. Detection of an external oscillation is addressed in the U.S. Pat. No. 5,838,561. The method we are about to describe will permit to determine whether the oscillations are due to a control tuning problem. The analysis is carried out using the power spectrum density of the deviation error signal. Therefore, we assume that the estimation method of the spectrum is reliable and not subject to any aliasing. In trying to determine the sources of oscillation for a given control loop, we consider the following two situations: 1) actuator and sensor having linear characteristics, as a sign of good functioning equipment. In this case, the control loop is linear and can be represented by a linear transfer function. 2) actuator or sensor having non-linear behavior as a result of equipment failure. In that case we consider the Describing Function method, Cook P. A., "Nonlinear dynamic systems. Prentice-Hall Inc, 1986", to analyse oscillations in that loop.

Figure 2:
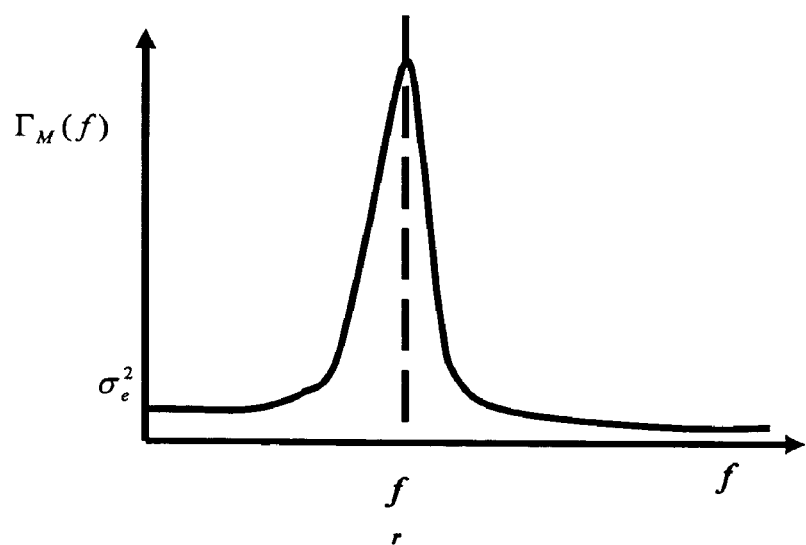
FIG. 2 illustrates the resonance phenomenon in the power spectrum of a poorly tuned control loop. It occurs in a relatively narrow frequency range, at the so-called resonant frequency and to a lesser extent at the surrounding frequencies.
Figure 5:
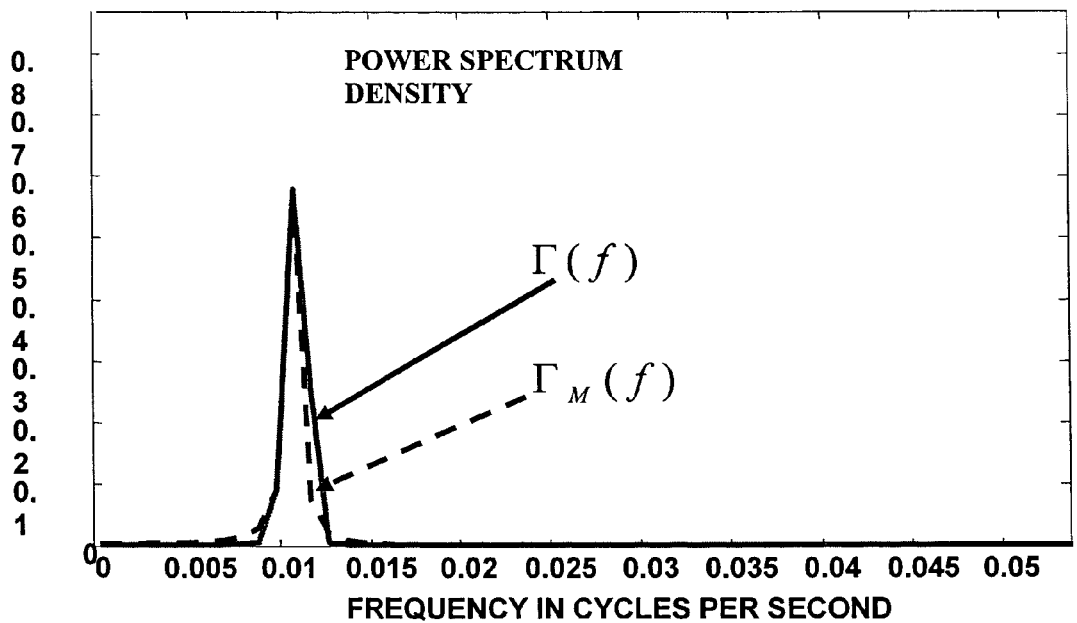
FIG. 5 Power spectrum densities, $\Gamma_M(f)$ and $\Gamma(f)$, for the level control loop of FIG. 4. It can be seen that $\Gamma_M(f)$ is a good approximation of $\Gamma(f)$, indicating that the oscillations are caused by the controller.
Figure 6:
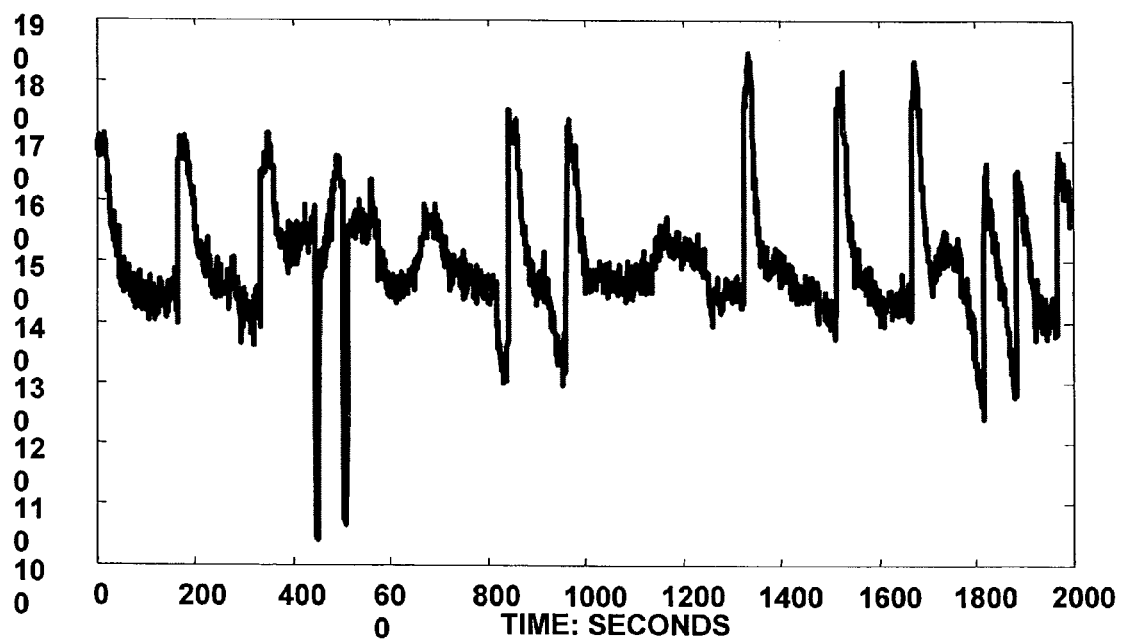
FIG. 6 Output response for a pressure control loop, with a stiction level of 14% causing loop to oscillate.

Case 1, Linear relationships: because of the presence of oscillations in the control loop of FIG. 1, the transfer functions between SP(s) and PV(s), or between e(s) and PV(s) is of second-order or higher. A second order model, such as the one obtained using the approach described by Shamash Y. in "Linear system reduction using Padé approximation to allow retention of dominant modes, Int. J. Control: 21 (2) 257–272, 1975" is usually adequate to approximate the dynamics of that loop. In this case we can write $$\Gamma(s) = \frac{ER(s)}{d(s)} \text{ and}$$

$$\Gamma_M(s) = \frac{1}{\frac{s^2}{4\pi^2 f_n^2} + \frac{\xi}{\pi f_n}s + 1},$$

where d(s) represents the disturbances signal, $f_n$ is the natural frequency and $\xi$ is the damping ratio. Therefore, the spectrum, $\Gamma_M(f)$, of ER based on this second order approximation model (see FIG. 2 for an illustration of $\Gamma_M(f)$ and the dashed line in FIG. 5) is given by:

$$\Gamma_M(f) = \frac{\sigma_e^2}{(1 - \frac{f^2}{f_n^2})^2 + (\frac{2\xi f}{f_n})^2},$$

where $\sigma_e^2$ is the variance of the disturbances.

$\Gamma_M(f)$ is an approximation to the spectrum $\Gamma(f)$ determined from using time series of the deviation error signal ER(t).

$\Gamma_M(f)$ is maximum when $f=f_r$. The resonance frequency $f_r$ is given by $$f_r = f_n \sqrt{1-\xi^2}.$$

When a control loop is mal-tuned, $0<\xi<<1$, therefore $f_r \approx f_n$. And at $f=f_n$, $$\Gamma_M(f_n) = \frac{\sigma_e^2}{(2\xi)^2}.$$

An estimate of $\sigma_e^2$, the variance of disturbances, and the damping ratio $\xi$, is obtained by combining this last equation with the following one:

$$\Gamma_M(f_n + \varepsilon\Delta f) = \frac{\sigma_e^2}{(1 - \frac{(f_n + \varepsilon\Delta f)^2}{f_n^2})^2 + (\frac{2\xi(f_n + \varepsilon\Delta f)}{f_n})^2},$$

where $\Delta f$ is the frequency resolution, and $\varepsilon=1$ or $\varepsilon=-1$, where the value of $\varepsilon$ is chosen to minimize the error between $\Gamma_M(f)$ defined above and the spectrum $\Gamma(f)$ determined from using the time series of the deviation error signal $ER(t)$. To be able to estimate $\sigma_e^2$ and $\xi$ using the above equations, we assume that $\Gamma_M(f) \approx \Gamma(f)$ around the resonance frequency and then substitute $\Gamma_M(f_n+\varepsilon\Delta f)$ by $\Gamma(f_n+\varepsilon\Delta f)$, and $\Gamma_M(f_n)$ by $\Gamma(f_n)$ in those equations, which leads to the following:

$$\xi = 0.5 \sqrt{\frac{1 - \left(\frac{f_n + \varepsilon\Delta f}{f_n}\right)^2}{\frac{\Gamma(f_n)}{\Gamma(f_n + \varepsilon\Delta f)} - \left(\frac{f_n + \varepsilon\Delta f}{f_n}\right)^2}}$$

and $$\sigma_e = 2\xi\sqrt{\Gamma(f_n)}.$$

Therefore, from the above equations, the second order approximation is completely defined.

It will be appreciated that when a linear control loop is poorly tuned, it tends to oscillate at one frequency with a modulating magnitude. This is because frequencies around the resonance frequency are also amplified, and are present in the signal. The second order approximation model used here aims at capturing this phenomenon.

Figure 8:
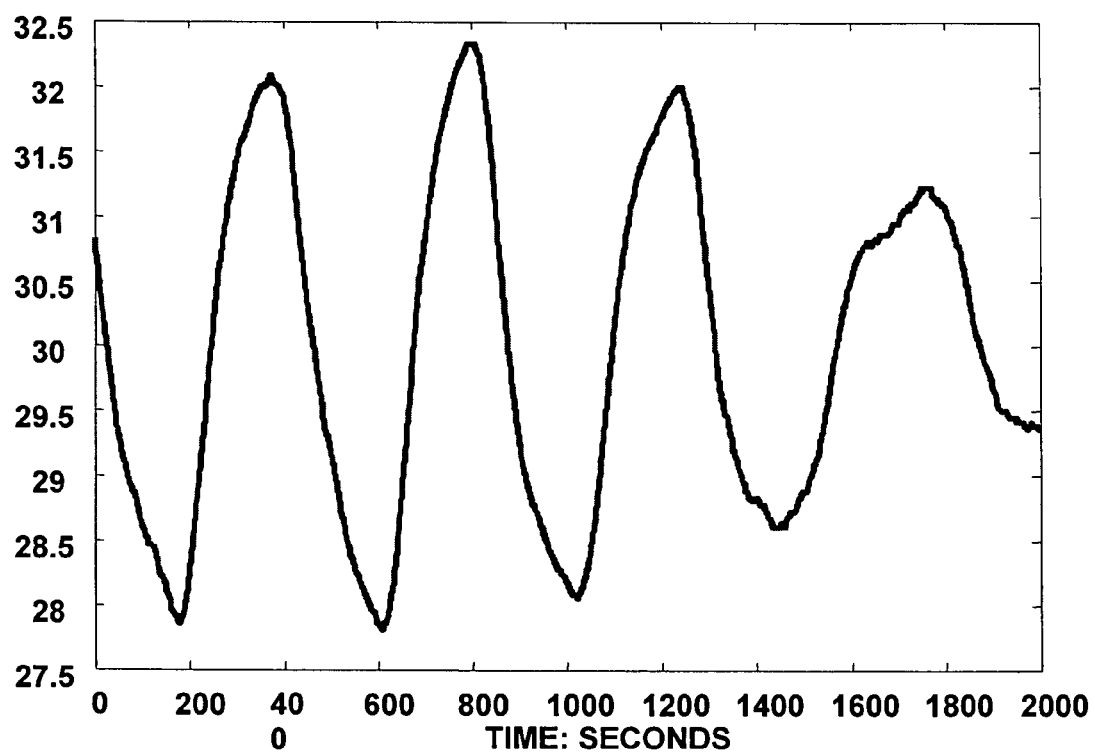
FIG. 8 Output response for a temperature control loop, with a backlash level of 7% causing the loop to oscillate.
Figure 9:
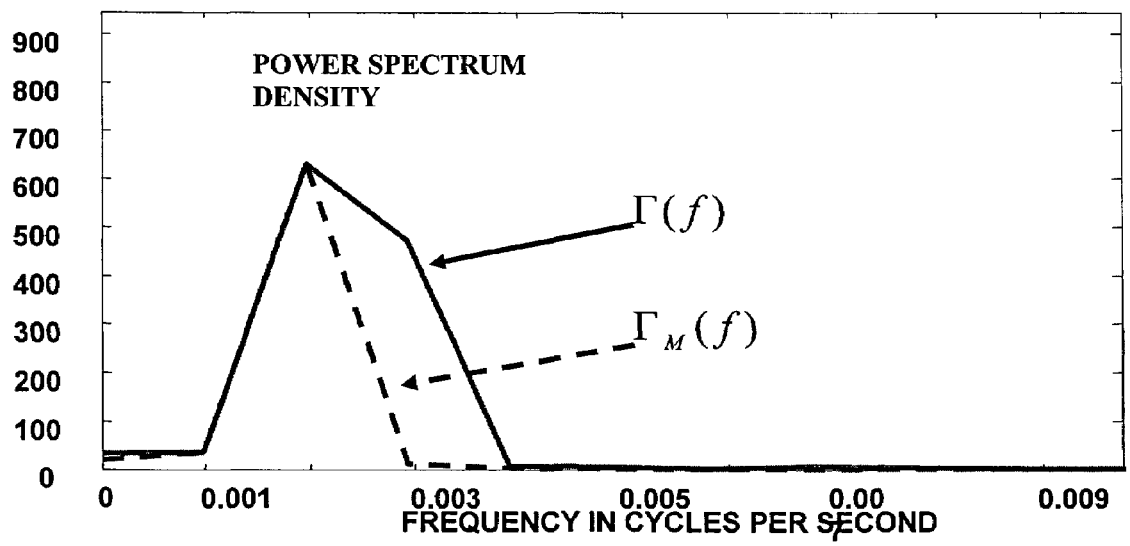
FIG. 9 Power spectrum densities, $\Gamma_M(f)$ and $\Gamma(f)$, for the temperature control loop of FIG. 8. It can be seen that $\Gamma_M(f)$ is not an approximation of $\Gamma(f)$.

When backlash is present, as illustrated in FIGS. 8 and 9, the difference between the model and the power spectrum density will be large enough to show that it is not a tuning problem.

Case 2, actuator or sensor non-linear behaviour: In this case, the loop of FIG. 1 is a nonlinear feedback control loop. We can use the Describing Function method to simplify the analysis of such a nonlinear feedback system, to show that:

$$ER(t) = SP(t) - PV(t) \approx \sum_{i=1}^{\infty} C_n \sin(2\pi n f_0 t + \phi_n),$$

where $f_0$ is the fundamental frequency and $nf_0$ are the harmonics. In this case, the spectrum ER is given by:

$$\Gamma_{ER}(f) = \sum_{n=1}^{\infty} (\frac{C_n}{2})^2 \delta(f - nf_0),$$

where $\delta(f)$ is an impulse function which is null at all frequencies except when $f=0$.

Figure 3:
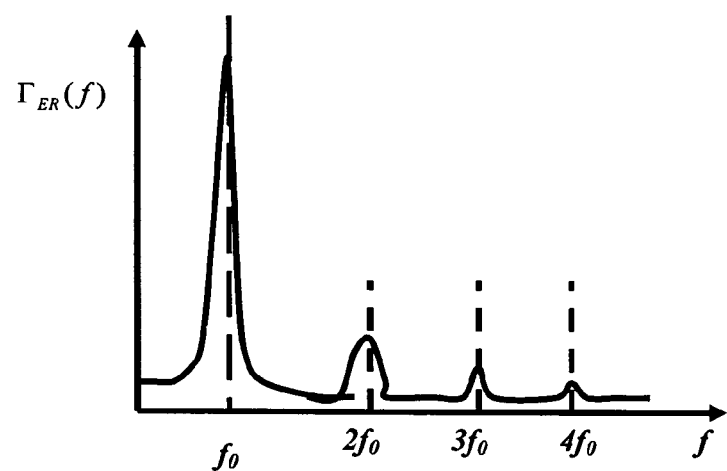
FIG. 3 Illustrates the type of oscillations caused by an equipment failure; there is a fundamental frequency at $f_0$, accompanied by harmonics $nf_0$ at equidistant intervals of $f_0$.
Figure 4:
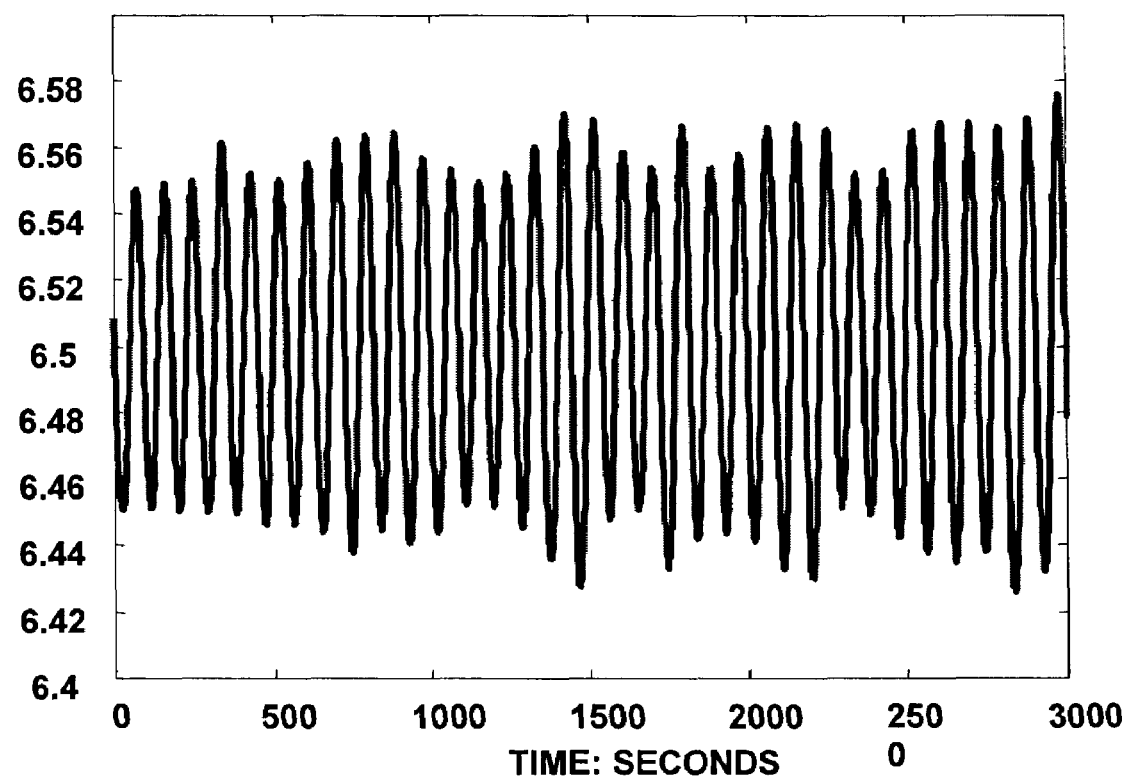
FIG. 4 Output response for a level control loop where oscillations are caused by a mal-tuned control.
Figure 7:
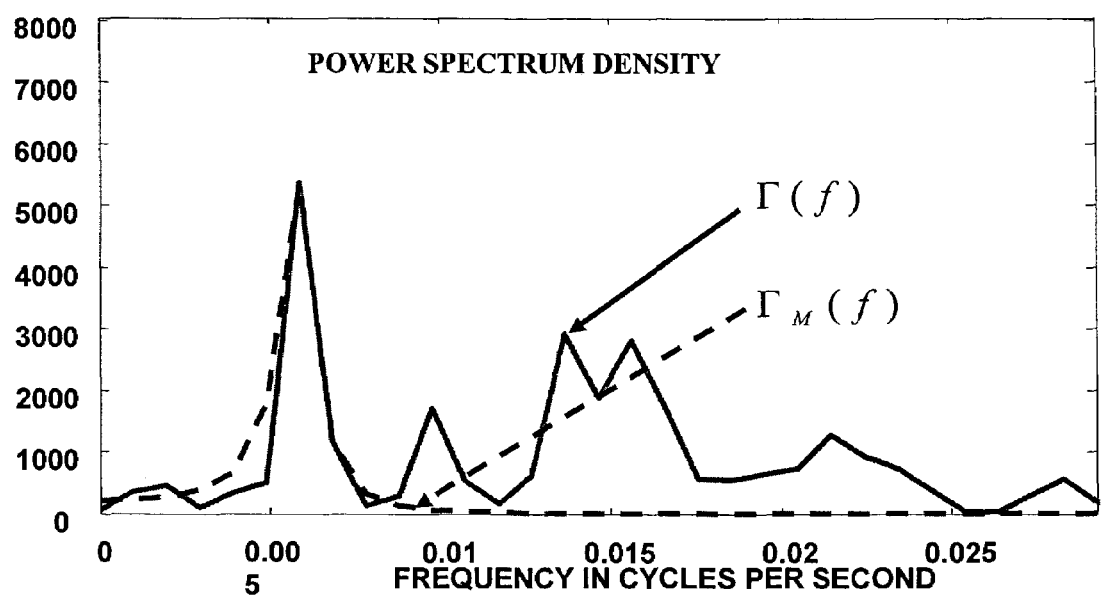
FIG. 7 Power spectrum densities, $\Gamma_M(f)$ and $\Gamma(f)$, for the pressure control loop of FIG. 6. It can be seen that $\Gamma_M(f)$ is not an approximation of $\Gamma(f)$. The approximation does not include the high frequency components caused by harmonics induced by the stiction. Therefore, the oscillations are not caused by the controller.

It follows from the expression of $\Gamma_{ER}(f)$ that the spectrum of ER is a set of impulses at a spacing of $f_0$. FIG. 3 illustrates this behaviour, and FIG. 7 illustrates both $\Gamma(f)$ and $\Gamma_M(f)$ for an example of this behaviour.

From the above, it can be concluded that oscillations created by poor control tuning and those caused by malfunctioning actuators present distinguishable patterns when their spectra $\Gamma_{ER}(f)$ are analysed. Furthermore, poor tuning of a control loop leads to an amplification of variability that affects the loop. This effect occurs in a relatively narrow frequency range, at the so-called resonant frequency, and, to a lesser extent, at the surrounding frequencies. In a poorly tuned loop, the control error would typically exhibit oscillations in the time domain at a given frequency with varying amplitude.

It has been shown that, in the process industry, the dynamic of a closed loop system could be generally approximated by a second order model, i.e., where the input and output are related through second order differential equations. A second order model of the process is completely defined by three parameters: the gain, the damping factor, and the natural frequency. Poor tuning results in a low value of the damping coefficient and a large amplification around the resonant frequency close to the natural frequency.

If we assume that the disturbances affecting the process are reasonably well distributed in frequencies, the power spectral density of the control error will be proportional to the square of the module of the transfer function. The transfer function, a second order approximation of the process, can then be estimated from the value of the power spectral density around the resonant frequency.

The method developed is based on the evaluation of how well the power spectral density curve of the control error can be modeled using a second order approximation of the process transfer function.

Figure 11:
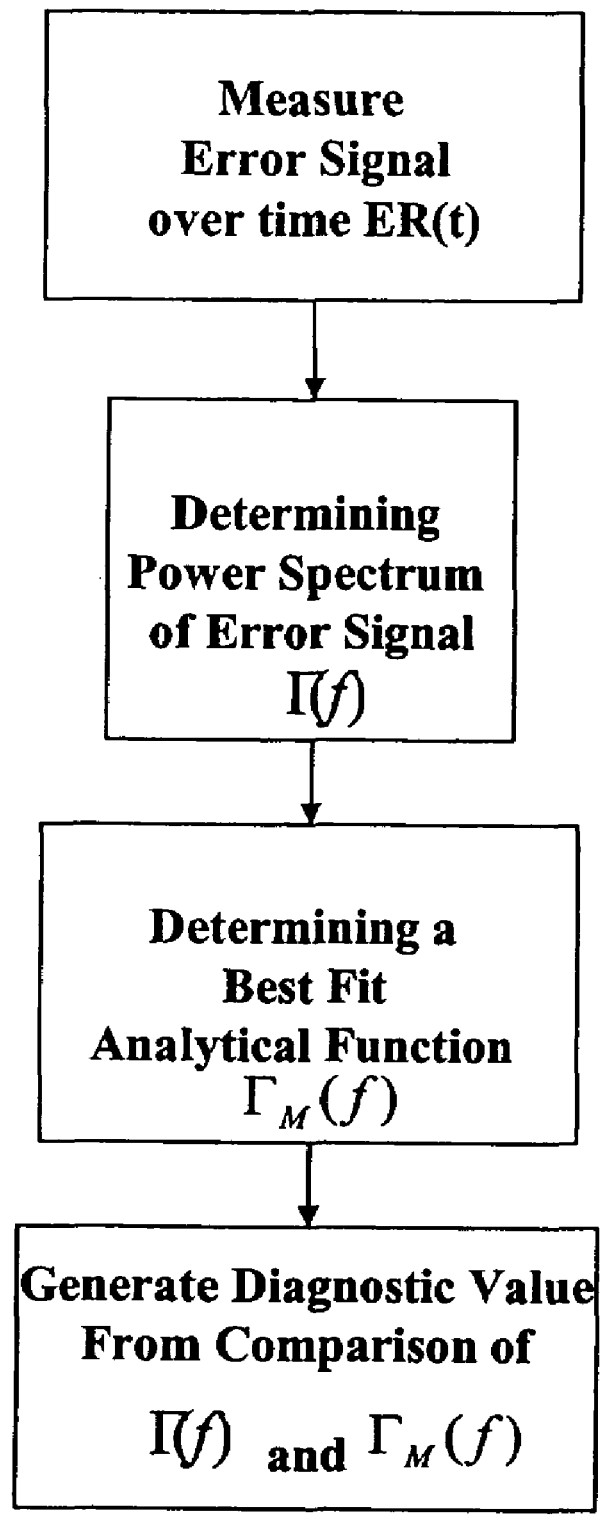
FIG. 11 is a block diagram of a control loop diagnostic method according to the present invention

As illustrated in FIG. 11, the method involves the following steps:

Calculate the power spectral density $\Gamma(f)$ of the control error using the time series of the error signal $ER(t)$.

Determine the frequency at which the power spectral density is maximum

Derive the second order model, and generate the analytical approximation of the power spectral density $\Gamma_M(f)$.

Establish if the model based estimation of the spectral density of the control error is a valid approximation of the actual one, in which case malfunctioning is due to inadequate tuning.

The following ratio is used to compare $\Gamma_M(f)$ with $\Gamma(f)$ $$R(\%) = 100 \frac{\sum_{k=n_0}^{n} (\Gamma(k\Delta f) - \Gamma_M(k\Delta f))}{\sum_{k=n_0}^{n} \Gamma(k\Delta f)},$$

where $\Delta f$ is the frequency resolution, $n_0$ is chosen as to exclude frequencies close to zero where the power spectrum density is likely to be poorly estimated. A threshold of $n_0 \approx 5$ is often used which means that the first $n_0$ value of the power spectral density is not used in the comparison with the model based estimation. n is the dimension of $\Gamma(f)$. R(%) close to zero indicates that excess variation is due to frequencies around the resonant frequency caused by tuning problems. An R(%)>>0 indicates that other frequencies, possibly harmonics are contributing to excess variation. R(%) is compared to a threshold in the range of (10 to 15%) to decide which phenomenon is prevailing.

Actuator problems, such as stiction, typically lead to harmonic oscillations of the type illustrated in FIG. 3. The spectrum of the output response for a pressure control loop exhibiting oscillations at the harmonic frequencies is illustrated in FIG. 7. A comparison between $\Gamma_M(f)$ and $\Gamma(f)$ will yield in this case an R(%)>>0, indicating that the oscillation is due to malfunctioning equipment.

Similarly, other non-linear behaviour, due for example to backlash, may yield a power spectrum such as that in FIG. 9.

Figure 10:
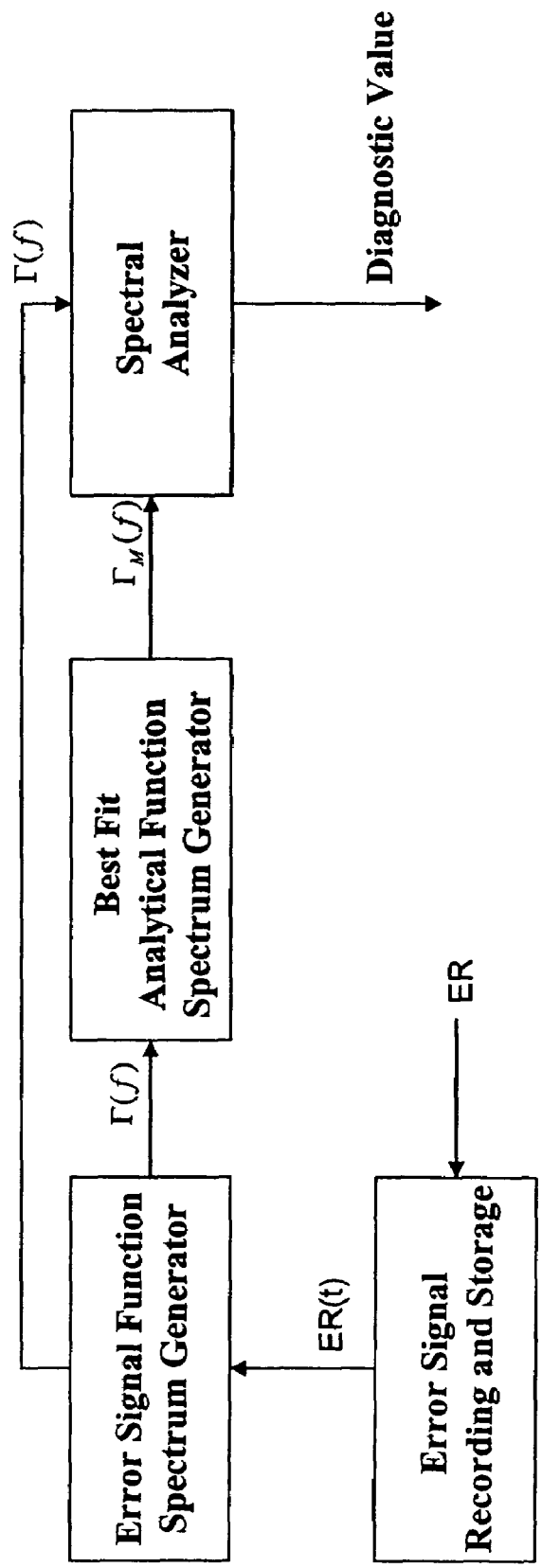
FIG. 10 is a block diagram of apparatus used according to the present invention for control loop oscillation diagnostic purposes

In the preferred embodiment, the invention is implemented by apparatus as illustrated in FIG. 10. The error signal ER is recorded over time to provide the time series signal ER(t). This apparatus may also be provided by software running in computerized control loop monitoring equipment.

The invention claimed is:

1. A control loop diagnostic method comprising:
   measuring an error in a control loop over time to determine a power spectral density of said error;
   determining a best fit analytical function describing said power spectral density;
   measuring a diagnostic value from a difference between said best fit analytical function and said power spectral density of said error; and
   outputting said diagnostic value,
   wherein said diagnostic value provides a classification indication of one of tuning error and malfunction of said control loop.

2. The method as claimed in claim 1, wherein said analytical function describes a poorly-tuned control loop exhibiting resonance around a resonant frequency.

3. The method as claimed in claim 2, wherein said analytical function is a second order approximation model defined by a natural frequency, a damping ratio and a variance.

4. The method as claimed in claim 3, wherein said analytical function is determined to have substantially a same intensity value for a peak around said natural frequency as said power spectral density and substantially a same slope on at least one side of said peak as said power spectral density.

5. The method as claimed in claim 4, wherein said analytical function is automatically determined from said power spectral density.

6. The method as claimed in claim 1, further comprising a step of determining from said difference whether corrective response is necessary.

7. The method as claimed in claim 2, further comprising a step of determining from said difference whether corrective response is necessary.

8. The method as claimed in claim 1, further comprising a step of determining from said difference whether corrective response is necessary.

9. A computer readable memory comprising a plurality of instructions which when executed perform the steps of:
   measuring an error in a control loop over time to determine a power spectral density of said error;
   determining a best fit analytical function describing said power spectral density;
   measuring a diagnostic value from a difference between said best fit analytical function and said power spectral density of said error; and
   outputting said diagnostic values,
   wherein said diagnostic value provides a classification indication of one of tuning error and malfunction of said control loop.

10. The computer readable memory as claimed in claim 9, wherein said analytical function describes a poorly-tuned control loop exhibiting resonance around a resonant frequency.

11. The computer readable memory as claimed in claim 10, wherein said analytical function is a second order approximation model defined by a natural frequency, a damping ratio and a variance.

12. The computer readable memory as claimed in claim 11, wherein said analytical function is determined to have substantially a same intensity value for a peak around said natural frequency as said power spectral density and substantially a same slope on at least one side of said peak as said power spectral density.

13. The computer readable memory as claimed in claim 10, wherein said diagnostic value provides a classification indication of one of tuning error and malfunction of said control loop.

* * * * *